United States Patent
Dong et al.

(10) Patent No.: US 9,677,957 B2
(45) Date of Patent: Jun. 13, 2017

(54) SERIAL FIBER BRAGG GRATING INTERROGATOR WITH A PULSED LASER FOR REFLECTION SPECTRUM MEASUREMENT

(71) Applicant: Sentek Instrument LLC, Blacksburg, VA (US)

(72) Inventors: Bo Dong, Blacksburg, VA (US); Fabin Shen, Sammamish, WA (US); Anbo Wang, Blacksburg, VA (US)

(73) Assignee: Senek Instrument LLC, Blacksburg, VA (US)

(*) Notice: Subject to any disclaimer, the term of this patent is extended or adjusted under 35 U.S.C. 154(b) by 439 days.

(21) Appl. No.: 14/092,212

(22) Filed: Nov. 27, 2013

(65) Prior Publication Data

US 2014/0152995 A1    Jun. 5, 2014

Related U.S. Application Data

(60) Provisional application No. 61/730,187, filed on Nov. 27, 2012.

(51) Int. Cl.

| | |
|---|---|
| *G01B 9/02* | (2006.01) |
| *G01L 1/24* | (2006.01) |
| *G01D 5/353* | (2006.01) |
| *G01D 18/00* | (2006.01) |
| *E21B 47/12* | (2012.01) |

(52) U.S. Cl.
CPC ............ *G01L 1/246* (2013.01); *E21B 47/123* (2013.01); *G01D 5/35312* (2013.01); *G01D 5/35316* (2013.01); *G01D 18/00* (2013.01)

(58) Field of Classification Search
CPC  G01L 1/246; G01D 5/35316; G01D 5/35312; G01D 518/00
See application file for complete search history.

(56) References Cited

U.S. PATENT DOCUMENTS

| | | | |
|---|---|---|---|
| 4,848,906 A * | 7/1989 | Layton .................. | G01H 9/004 250/227.19 |
| 5,838,437 A | 11/1998 | Miller et al. | |
| 6,449,047 B1 | 9/2002 | Bao et al. | |
| 6,571,027 B2 * | 5/2003 | Cooper .............. | G01D 5/35383 250/227.19 |
| 7,573,021 B2 | 8/2009 | Haber et al. | |
| 2005/0213103 A1 * | 9/2005 | Everett ................ | A61B 5/0066 356/479 |
| 2008/0018904 A1 * | 1/2008 | Waagaard .......... | G01D 5/35312 356/478 |
| 2008/0106745 A1 | 5/2008 | Haber et al. | |

* cited by examiner

*Primary Examiner* — Hwa Lee
(74) *Attorney, Agent, or Firm* — Whitham, Curtis & Cook, P.C.

(57) ABSTRACT

A serial weak FBG interrogator is disclosed. The serial weak FBG interrogator may include a CW tunable laser or pulsed laser utilized as a laser source and an EDFA. The serial weak FBG interrogator may also be an interrogation of a single sensor system by utilization of a DFB laser which utilizes a single sensor, which may be an interferometer sensor, an extrinsic Fabry-Perot interferometer or a wavelength-modulated sensor. The serial weak FBG interrogator may also include a computer system or CSPU.

8 Claims, 15 Drawing Sheets

SERIAL FIBER BRAGG GRATING INTERROGATOR WITH A PULSED LASER FOR REFLECTION SPECTRUM MEASUREMENT

This application claims priority to U.S. Provisional Application 61/730,187 filed on Nov. 27, 2012, the entire disclosure of which is incorporated by reference.

BACKGROUND

Optical fiber Bragg grating or FBG is a short segment of optical fiber in which its refractive index in the core or cladding or both varies periodically along the fiber. When a broadband light is launched into an FBG, only the light at the resonance wavelength, which is also known as the Bragg wavelength, is reflected. The Bragg wavelength is given by:

$$\lambda_B = 2n_{eff}\Lambda$$

where $n_{eff}$ is the effective index of refraction of the fiber and $\Lambda$ is the grating period. It is clear that any change in $n_{eff}$ or $\Lambda$ will shift the Bragg wavelength. The most common parameters that may shift the Bragg wavelength may be temperature, strain and pressure. Therefore FBGs may be utilized as a sensor to measure these physical quantities. Besides these quantities that may directly change the Bragg wavelength, some other physical, chemical or biological quantities could also be measured by coating the surface of an FBG with a special material. The dimensions or temperature of the coating may change when the coating is exposed to a quantity. This change will then shift the Bragg wavelength of the FBG. For example, when an FBG is coated with a piezoelectric or magnetostrictive material, the coated FBG may then be utilized as a sensor to measure electric or magnetic fields. If an FBG is coated with palladium, the FBG may be utilized to measure hydrogen concentration. There may be many other examples to utilize an FBG for sensing of a variety of physical, chemical or even biological parameters.

It is also often desirable to multiplex a number of FBGs in a single optical fiber for quasi-distributed sensing. Typical methods for FBG multiplexing include the wavelength division multiplexing or WDM, the time division multiplexing or TDM, the optical frequency-domain reflectometry or OFDR, and various combinations of some of these methods.

SUMMARY OF THE INVENTION

In one exemplary embodiment, Fiber Bragg Grating based distributed sensors may be described. The Fiber Bragg Grating based distributed sensors include an optical or optical fiber interferometer that may provide information about the laser output power and wavelength in real-time for laser calibration.

BRIEF DESCRIPTION OF THE DRAWINGS

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Figure 1:
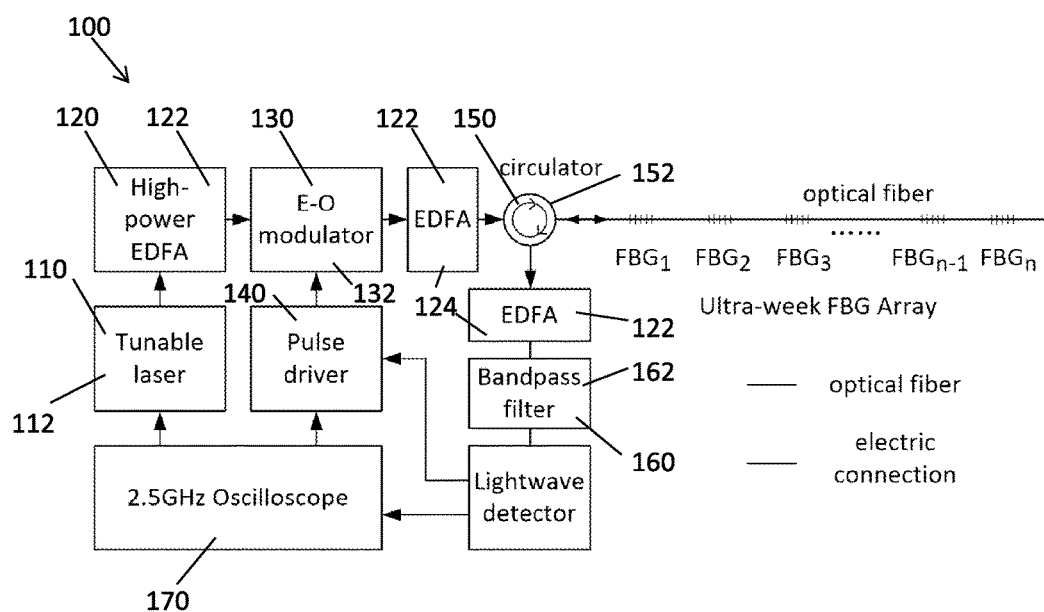
FIG. 1 is an exemplary diagram showing a wavelength swept time domain multiplexing system.

FIG. 1 is an exemplary diagram showing a wavelength swept time domain system or WSTDM system 100. The WSTDM system 100 may include a tunable laser 110, a plurality of fiber amplifiers 120, an electro-optical modulator 130, a pulse generator 140, a circulator 150, a bandpass filter 160 and a computer oscilloscope 170. The tunable laser 110 may be a continuous wave or CW wavelength tunable laser 112 or the like. The fiber amplifiers 120 may be a high-powered erbium-doped fiber amplifier or EDFA 122 or the like. The fiber amplifiers 120 may also include a pair of erbium-doped fiber amplifiers 124 or the like. The electro-optical modulator 130 may be received from an amplified CW laser 132 to convert the amplified CW laser 132 into pulses with a desired pulse width and pulse repetition rate. The electro optical or EO modulator 130 may serve as an on/off high-speed optical switch. The pulse generator 140 may control the pulse repetition rate or frequency, pulse width delay with respect to an internal or external trigger and the high and low voltage levels of the pulses. The circulator 150 may be a fiber circulator 152 or the like. The bandpass filter 160 may be an optical band pass filter 162 to accommodate an approximate 6 nm wavelength of light or the like. The computer oscilloscope 170 may be utilized to observe the change of an electrical signal over time. The WSTDM system 100 may be utilized for multiplexing approximately 1,000 ultra weak identical FBGs in a fiber or the like.

A continuous wave or CW wavelength tunable laser launches its CW output laser into an erbium-doped fiber amplifier or EDFA. The amplified laser may then be injected into an electro-optic or EO modulator to convert the CW laser into pulses with a desired pulse width and pulse repetition rate. The EO modulator acts as an on/off high-speed optical switch. The desired pulse width may be dictated by the spatial separation between two neighboring FBGs and the pulse repetition rate may be limited by the time of flight of the laser pulse in the entire fiber span. To compensate for the high loss of the EO modulator in the range of approximately 7-10 dB another EDFA may be utilized to boost the laser power before the light may be launched into the FBG array after a fiber circulator. The incident laser pulse may be reflected partially by each of the serial FBGs. The magnitude of the pulse reflected by an FBG may be determined in part by the pulse wavelength and the FBG reflection spectrum. The successive pulses reflected by the FBG array may be amplified by the third EDFA. The utilization of the optical band pass filter before the light detector may be to suppress the amplified spontaneous emission or ASE noise from the three EDFAs. This measurement process may be repeated for each of the wavelengths of the tunable laser over a certain spectral tuning range that may cover the entire spectral range where an FBG reflection may appear. For temperature measurement, for instance, if the thermal dependence of an FBG may be approximately 10 pm/° C., for an approximate 200° C. measurement range, the wavelength tuning range has to be at least approximately 2 nm. Also, the wavelength tuning increment should be set such that enough sampling points at different wavelengths within the FBG reflection spectrum may be obtained. Based on the magnitudes of the returned pulses at different wavelengths from each FBG, the grating reflection spectrum may be reconstructed. By the reconstructed spectrum and its comparison with the original spectrum of the FBG, the measurement that causes the FBG spectrum to shift may be determined. A method of spectrum correlation between the shifted and the original spectra was utilized to accurately determine the shift to the FBG peak wavelength. The technique shown in FIG. 1 was utilized to successfully demonstrate multiplexing of approximately 1,000 weak FBGs in a fiber. Although the WSTDM method may be feasible for multiplexing a very large number of FBGs, the system has the drawbacks of system complexity and relatively high cost.

Figure 2:
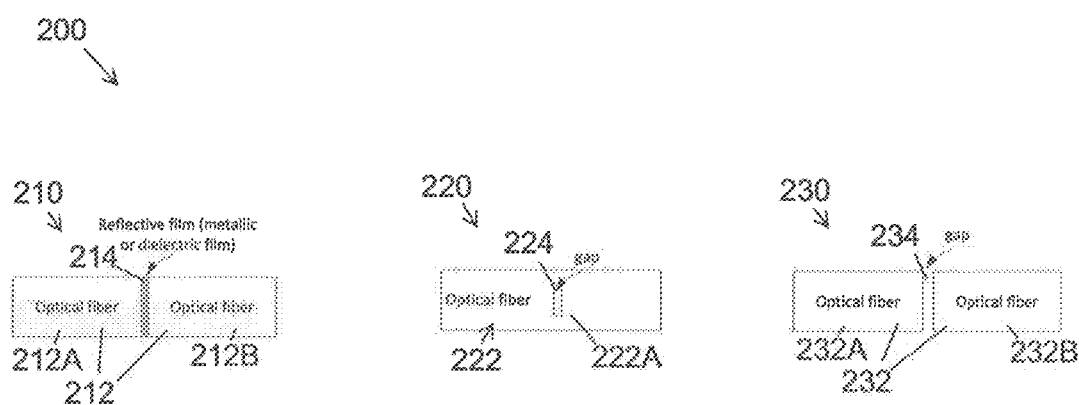
FIG. 2 is an exemplary diagram showing a plurality of partial optical reflector designs.

FIG. 2 is an exemplary diagram showing a plurality of partial optical reflector designs 200. The partial optical reflector designs 200 may include a first partial optical reflector design 210, a second partial optical reflector design 220 and a third partial optical reflector design 230. The first partial optical reflector design 210 may include a pair of optical fibers 212 and a reflective film 214. The pair of optical fibers 212 may include a first optical fiber 212A and a second optical fiber 212B. The reflective film 214 may be placed between the first optical fiber 212A and the second optical fiber 212B. The reflective film 214 may be a metallic film, a dielectric film (not shown) or the like. The second partial optical reflector design 220 may include an optical fiber 222 and a gap 224. The optical fiber 222 may have a middle portion 222A or the like. The gap 224 may be disposed on the middle portion 222A or the like. The third partial optical reflector design 230 may include a pair of optical fibers 232 and a reflective film 234. The pair of optical fibers 232 may include a first optical fiber 232A and a second optical fiber 232B.

Nearly all techniques reported in the past for multiplexing FBGs rely on the utilization of a tunable laser. The wavelength tuning of a laser may be often associated with a change in the laser output power. Also, the wavelength tuning may not be linear and also may not be repeatable. For example, a distributed feedback or DFB laser may be tuned smoothly without mode hoping by its temperature for a number of nanometers. The temperature may be usually controlled by a built-in semiconductor based thermoelectric cooler or TEC. The temperature of the laser may be measured by a thermistor. However, the relation between the laser wavelength and the voltage output by the thermistor may be nonlinear and may vary from laser to laser. Even for a given laser, this relation may vary over time. It may be therefore important to have a device that may provide information about the laser output power and wavelength in real-time for laser calibration.

An optical or optical fiber interferometer may be utilized for this purpose. The types of interferometers that may be utilized for the real-time laser calibration include but may be not limited to the Mach-Zehnder interferometer or MZI, the Michelson interferometer or MI, the Fizeau interferometer or FI, and the Fabry-Perot interferometer FPI. Further, these interferometers may be built with optical fiber and fiber components such as broadband partial reflectors, fiber couplers, fiber beam splitters, fiber beam combiners and fiber Faraday mirrors, or with bulk optical components, such as optical beam splitters, beam combiners, and mirrors. When bulk optic components may be utilized to build an interferometer for the laser calibration, optical collimators may be utilized to couple light from a fiber pigtailed to the laser to be calibrated into the interferometer or from the interferometer to a fiber that guides the light to sensors. One of the ways to build such an interferometer maybe to utilize two broadband partial reflectors or BPRs in an optical fiber to form a fiber Fabry-Perot or FP interferometer.

A BPR may be obtained by a broadband FBG, a reflective thin film between two fibers and a small hollow gap in a fiber or between two fibers. The broadband FBG may include a relatively small number of gating periods with a constant period or an FBG with a varying grating period. The broadband FBGs fabricated by the second method may be often referred to as chirped gratings. The grating period chirp may be linear or nonlinear. The reflective thin film may be a single layer of dielectric or metallic material or may be a stack of multi-layers of dielectric materials with different refractive indices. The film may be fabricated directly on the end of a fiber by various methods such as thermal evaporation, sputtering and self-assembly of monolayers. The small hollow gap or gap between two fibers may be generally smaller or much smaller than the wavelength of the laser to be calibrated. The hollow gap may be filled with air, other gas or gases, a liquid or a solid. The filling material must be transparent to the laser wavelengths and must have a refractive index different than that of the fiber so Fresnel reflections may take place at the interfaces between the fiber(s) and the material. It should be noted that the gap in a fiber may be formed by micromachining of a fiber from the side of the fiber or by spicing two fibers together. The side micromachining may be realized by different techniques such as the utilization of a high power pulse laser (i.e., a femtosecond laser) or a focused ion beam or FIB. If the gap may be created by thermal fusion splicing two fibers, one or both of the two fibers may need to be altered on their ends before the splice. One way to alter a fiber end may be, but not limited to, the application of an acid, such as hydrofluoric acid, to etch the core and the cladding of the fiber to different depths. This differential etching may be enabled by the dopants in the core or in the cladding or in both. These dopants may be essential to the formation of the fiber waveguide structure. One of the most common dopants may be germanium in the core of a silica fiber to raise the refractive index of the core to be slightly greater than that of the silica cladding. Because of the dopant(s), the etching rate of the fiber core may be controlled to be faster or slower than that of the fiber cladding by a suitable buffered acid solution. When a fiber that may be etched more in its core may be spliced to another fiber which may be unetched or etched via thermal fusion, a fiber with a small air void (i.e., a thin layer of air or another gas between the two fiber cores) may be created in the fiber. The thin layer of air void may function as a BPR.

Figure 3A:
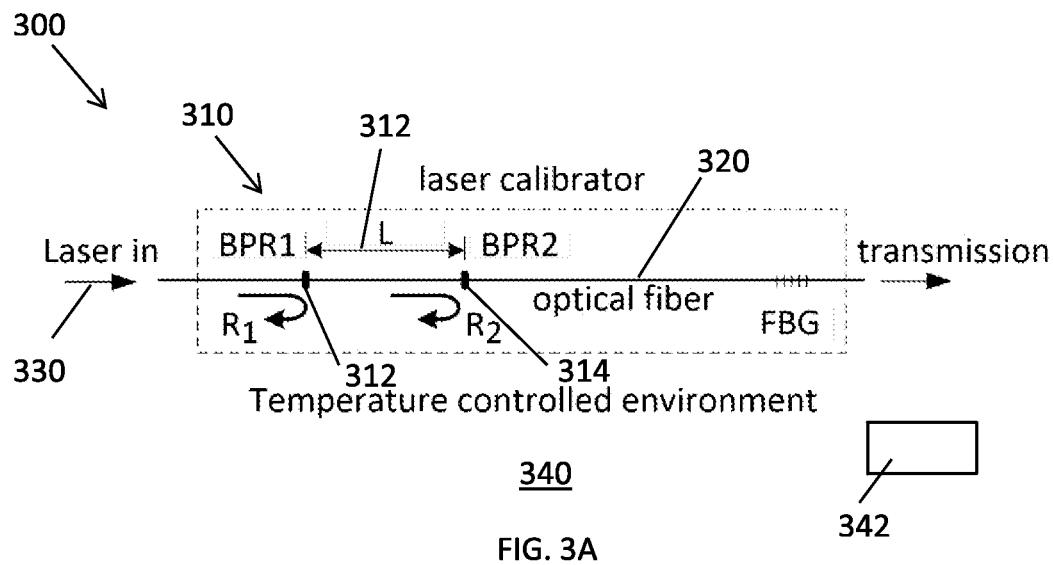
FIG. 3A is an exemplary diagram showing a BPR based fiber Fabry-Perot interferometer.

FIG. 3A is an exemplary diagram showing a BPR based fiber Fabry-Perot interferometer 300. The Fabry-Perot interferometer 300 may include a laser calibrator 310, an optical fiber 320, a laser beam 330 and a temperature controlled environment 340. The laser calibrator 310 may include a pair of BPRs 312 and a FBG 314. The optical fiber 320 may be extended through the laser calibrator 310. The optical fiber 320 may include the pair of BPRs 312 with a length 312A between the pair of BPRs. The optical fiber 320 may include the FBG 314. The laser beam 330 may be launched into the laser calibrator 310. The temperature controlled environment 340 may be usually controlled by a built-in semiconductor based thermoelectric cooler or TEC 342.

In all of the different BPR designs as described above, the BPR reflection bandwidth should be greater than the wavelength tuning range of the laser source that needs to be calibrated. When two BPRs may be serially connected by a piece of fiber with length L, a fiber Fabry-Perot or FP interferometer may be formed as shown in FIG. 3A. If a laser beam may be launched to the FP interferometer, each reflector reflects a portion of the incident laser power. The reflection $R_2$ from the second reflector or BPR2 may then be reflected by the first reflector or BPR1 again so it may be bounced back and forth within the FP cavity. Each bounce leaks some laser power out of the FP cavity. These leaked optical beams in each of the two directions will then interfere with each other to yield the total reflection or transmission optical power. If the reflector's reflectivity may be low, higher order reflections within the FP cavity may become negligible so the interference may be approximated as two beam interference. The optical power reflected from such an FP interferometer may be expressed by:

$$I = I_o\left[1 + \gamma\cos\left(\frac{4\pi n_{eff}L}{\lambda} + \phi_o\right)\right]$$

where $n_{eff}$ is the effective refractive index of the fiber, $\lambda$ is the laser wavelength in a vacuum and is a function of the tuning parameter $\kappa$ as given by $\lambda=\lambda(\kappa)$, $\phi_O$ is an initial phase, $\gamma$ is the fringe visibility and $I_O$ is a parameter proportional to the incident laser power. For a DFB laser, $\kappa$ may be the voltage from the thermistor built into the laser or the voltage or current applied to the built-in TEC. When the laser wavelength may be tuned, both the transmission and reflection laser powers of the FP interferometer will vary accordingly.

Figure 3B:
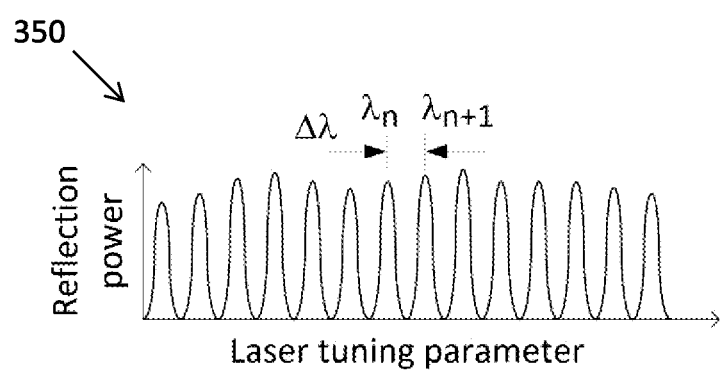
FIG. 3B is an exemplary diagram showing a FP reflection as a function of a laser tuning parameter.

FIG. 3B is an exemplary diagram showing a FP reflection as a function of a laser tuning parameter. FIG. 3b illustrates the reflection of the FBG FP interferometer in a graph 350. The magnitude of the envelope of these periodic or quasi-periodic power variations may be proportional to the laser power. One period of variation corresponds to a $2\pi$ differential phase change between R1 and R2 which leads to the corresponding wavelength change as:

$$\Delta\lambda = \frac{\lambda_{n+1}\lambda_n}{2Ln_{eff}}$$

For a small tuning range, the right hand of the equation above may be a constant and this constant may be known by calibrating the stabilized FP interferometer with another tunable laser with its tuning wavelengths known already. Actually, if we treat $1/\lambda$ as the variable, the period of I is solely determined by 2neffL, which may be controlled to a sufficient stable level. A relation between the tuning parameter $\kappa$ and the laser wavelength incremental changes may be established. Therefore, by the measurement of the envelope and periodicity of these variations, information may be extracted about the laser power and the wavelength after an initial calibration. For some sensing applications, even an initial calibration may not be necessary as long as the reflection or transmission trace may be repeatable for the tuning of the laser source all the time.

An FBG with a narrow bandwidth may also be utilized in conjunction with the FP interferometer. The FBG may be serially connected into the fiber either before BPR1 or after BFR2. The peak reflection wavelength of the FBG offers a known calibration wavelength which in conjunction with the fringes produced by the FP interferometer allows the determination of any other wavelengths within the laser tuning range. The FBG may be replaced by another element that may offer information about at least one fixed and known wavelength.

It may be also important to point out that the laser calibrator described may be applied to calibrate in real time a variety of tunable lasers. More importantly, it may make some low cost tunable lasers useful for the interrogation of different types of optical or optical fiber sensors which may include but may be not limited to fiber Bragg grating sensors, Fabry-Perot interferometers, other type of interferometers, and other wavelength modulation based sensors. One of the example low cost tunable lasers may be the distributed feedback or DFB lasers whose emission wavelength may be tuned thermally by varying the voltage or current applied to the built-in TEC. All the prior techniques for multiplexing of serial FBGs may be either limited in their multiplexing capacity or complicated and expensive. These systems offer not only a dramatically simplified configuration but also an increased FBG multiplexing capacity and new designs for multiplexing serial FBGs.

Figure 4:
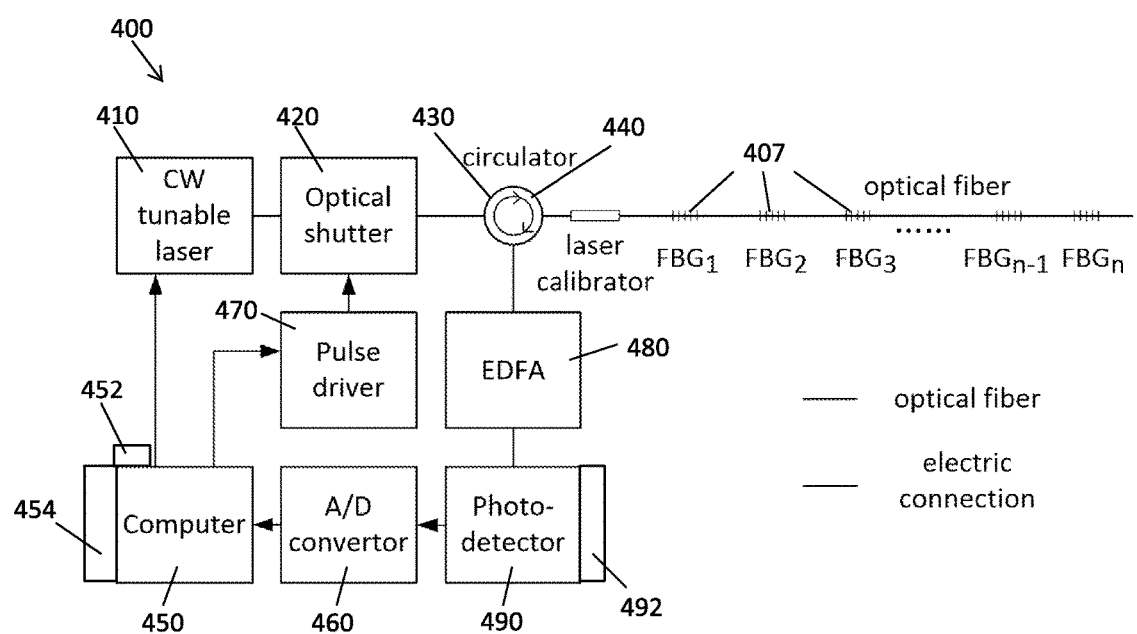
FIG. 4 is an exemplary diagram showing a first scheme of a serial weak FBG interrogator.

FIG. 4 is an exemplary diagram showing a first scheme of a serial weak FBG interrogator 400. The serial weak FBG interrogator 400 may include a CW tunable laser 410, an optical shutter 420, a circulator 430, a laser calibrator 440, a computer system 450, an A/D converter 460, a pulse driver 470, an EDFA 480 and a photodetector 490. The CW tunable laser 410 may be utilized as a laser source. The optical shutter 420 may have an optical gain. The circulator 430 may be an optical circulator or the like. The laser calibrator 440 may be to generate the information about the laser output power and wavelength. The computer system 450 may have a processor 452 and a memory system 454. The computer system 450 may be utilized to observe changes of an electrical signal over time. The A/D converter 460 may convert a continuous physical quantity (i.e., voltage) to a digital number that represents the quantity's amplitude. The pulse driver 470 may be incorporated into the laser source to drive a pulse from the laser source. The EDFA 480 may or may not be incorporated into the serial weak FBG interrogator 400. The FEDA 480 may also be placed right after the optical shutter 420. The photodetector 490 may be utilized in combination with an optical band pass filter 492 before the photodetector 490. The serial weak FBG interrogator 400 may include an optical fiber 405 that includes a plurality of FBGs 407.

Figure 6:
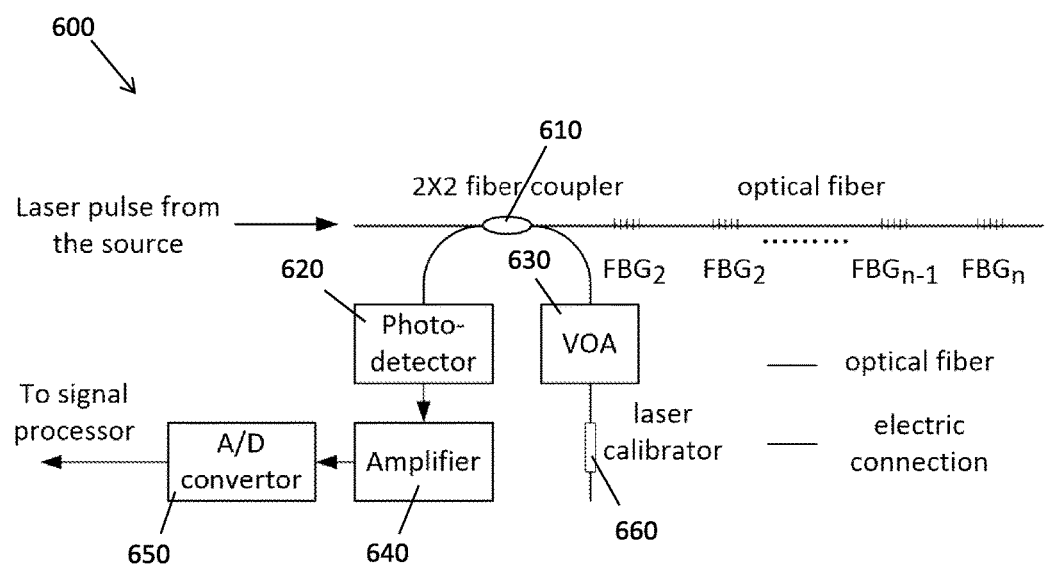
FIG. 6 is an exemplary diagram showing parallel utilization of a laser calibrator.

The first design for the interrogation of a serial FBG array is shown in FIG. 4. These FBGs may be identical or may be different in their reflection spectrum. A continuous wave or CW tunable laser may be utilized as the source. It should be pointed out that a broadband optical source followed by a tunable narrow bandpass optical filter may be utilized instead of the CW tunable laser. The light from the source may be launched into an optical shutter which converts the CW laser into an optical pulse. The shutter may or may not have an optical gain. After passing through the optical circulator, the laser pulse first enters into the laser calibrator and then propagates to the serial FBG array. These FBGs may have an equal or non-equal spatial interval between two neighboring FBGs. As discussed previously, the laser calibrator may be to generate the information about the laser output power and wavelength. It may be utilized between the laser source and the FBG array as shown in FIG. 4 or utilized separately by tapping a portion of the laser power out of the source as illustrated in FIG. 6. After the laser calibrator, each of the FBGs reflects in part the incident laser power so successive optical pulses may be reflected by the serial FBGs as in the system shown in FIG. 1. By timing the laser source to N different wavelengths, N sets of successive pulses may be produced corresponding to the N wavelengths. By the magnitudes of the N pulses for each FBG, the reflection spectrum of this FBG may then be constructed by the standard methods of curve fitting or data interpolation. It should be noted that the two broadband FBGs in the laser calibrator may be usually separated by a distance much shorter than the ones between two neighboring FBGs in the FBG sensor array. Therefore the two pulses reflected by the two broadband FBGs in the laser calibrator nearly coincide entirely so almost all the optical power in the two pulses participates in the optical interference which leads to the trace as shown in FIG. 3b. It should be noted that the utilization of the EDFA in the system shown in FIG. 4 may or may not be necessary depending on the system optical power budget. If the optical power returned to the detector may be low for a desired signal-to-noise ratio or SNR, adding an EDFA may help boost the signal power before the optical detector to improve the SNR. An additional EDFA may also be inserted between the optical shutter and the optical circulator to increase the power throughput for the same reason. If the EDFA 480 is placed after the optical shutter 420, the second EDFA may be placed before the photodetector 490. To minimize the amplified spontaneous emission or ASE which may be broadband in nature from getting into the photodetector, an optical band pass filter may also be utilized right before the photodetector. The filter pass band may be designed just to be enough to allow the FBG reflections to pass through so the ASE power outside the filter pass band will be blocked. A tunable narrow bandpass optical filter may also be utilized to more significantly suppress the ASE power. In this case, the tunable filter should be tuned with the laser simultaneously to follow the wavelength of the tunable laser. It should be pointed out that other alternative optical devices, such as high-speed electro-optic modulators or optical switches, may also be utilized to replace the optical shutter as long as these devices may produce optical pulses with the desired pulse width from the input CW laser.

Figure 5:
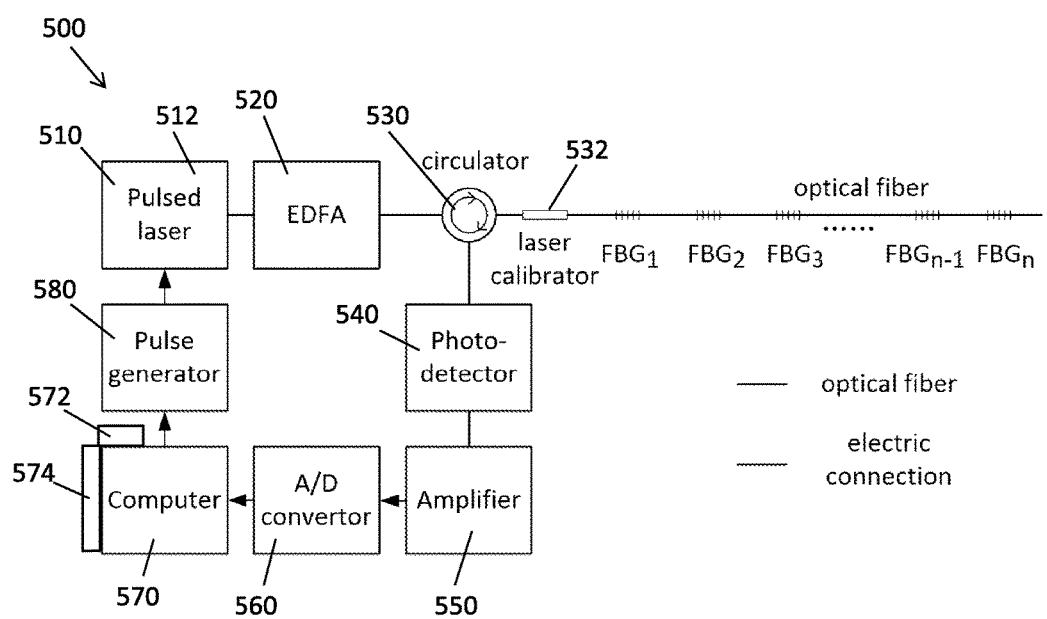
FIG. 5 is an exemplary diagram showing a second scheme of a serial weak FBG interrogator.

FIG. 5 is an exemplary diagram showing a second scheme of a serial weak FBG interrogator 500. The serial weak FBG interrogator 500 may include a pulsed laser 510, an EDFA 520, a circulator 530, a photodetector 540, an amplifier 550, an A/D convertor 560, a computer system 570 and a pulse generator 580. The pulsed laser 510 may be a wavelength tunable pulse laser 512 or the like. The circulator 530 may be in communication with a laser calibrator 532 to generate the information about the laser output power and wavelength. The EDFA 520 may be added either before the light may be injected into the FBG array or right before the photodetector 540. The electronic amplifier 550 may amplify the signal from the photodetector 540 to a sufficient level to best utilize the given resolution of the A/D converter 560. The computer system 570 may have a processor 572 and a memory system 574. The computer system 570 may be utilized to observe changes of an electrical signal over time. The pulse generator 580 may control the pulse repetition rate or frequency pulse width delay with respect to an internal or external trigger and the high and low voltage levels of the pulses.

The source may be a wavelength tunable pulse laser. The light from the light source may be injected into the serial FBG array. For the optical source, there may be different choices, which include but may be not limited to a thermally tuned distributed feedback or DFB laser, a vertical cavity surface emitting laser or VCSEL whose wavelength may be tuned by its driving current, and an array of laser diodes at different wavelengths. For the DFB laser case, its wavelength may be tuned by changing the laser temperature via a built-in TEC. A diode laser array may include a number of individual lasers with desired different wavelengths. Their outputs at different wavelengths may be combined into one common fiber by a wavelength division multiplexer. These lasers may be separate individual lasers or may be fabricated on a single semiconductor chip. Only one laser operates at a time. By switching these lasers sequentially in time, the wavelength of the laser injected into the output common fiber may be tuned discretely. Also the emission wavelength of each of the lasers may also be tuned over a relatively small range so there will be minimum or no spectral gaps in the optical spectrum covered by these lasers. No matter which type of light source may be utilized, the wavelength tuning step should be smaller than the spectral width of the FBGs so multiple wavelength sampling points within the reflection spectrum of each FBG may be obtained to be able to reconstruct the spectrum or to compute the FBG peak reflection wavelength.

One key in this design may be that the generation of a laser pulse and the tuning of the laser wavelength may be realized together by the same source itself. For example, in the DFB laser case, the laser pulse may be simply produced by applying a pulsed electric current to the driver of the laser and the laser wavelength may be tuned by changing the laser temperature. EDFAs may be added either before the light may be injected into the FBG array or right before the photodetector. However, the utilization of EDFAs may be always associated with the amplified spontaneous emission or ASE which may be broadband in nature. To suppress this ASE noise, normally the former choice may be preferred because the FBGs themselves act as ASE suppression filters. In addition, a high-speed optical switch or an optical shutter may be utilized after the EDFA 520. The switch or the optical shutter opens up only to allow the optical pulse from the optical source to pass through. At other times, the switch or the shutter remains close to prevent the ASE power from the EDFA from getting into the sensing fiber with the serial FBGs. The utilization of this switch or shutter may reduce the noise induced by optical reflections from points such as the far fiber end. The need for the utilization of these EDFAs should be determined by the desired optical power level for a given photodetector. If the power from the source may be sufficiently high for a set of serial FBGs to be interrogated, utilizing EDFA(s) may not be necessary.

In the systems shown in FIGS. 4 and 5, the laser calibrator may be utilized in the path of the laser propagation to the serial FBG array. In this case, the FBGs or optical reflectors in the laser calibrator should have reflectivity similar to that of the FBGs in the serial sensor link to best utilize the given resolution of the signal digitization (i.e., analog-to-digital conversion). To remove this limit, the laser calibrator may be utilized in some other ways. For example, the power from the optical source may be tapped into a separate channel to which the laser calibrator may be connected. The optical signal reflected from the laser calibrator may be detected by a photodetector. After the amplification of the signal, it may be then sent to separate channel of the analog-to-digital or A/D convertor, which may be a different channel from the one that receives the signal reflected from the FBG serial array. The disadvantage of doing so may be the increased system complexity. However, since the signal from the laser calibrator now travels in a separate channel different from the one from the serial FBG array so the BPRs and/or the FBG with stronger reflectance may be utilized to build the laser calibrator. As a result, higher SNR laser calibrating signal may be produced so more accurate measurement of the serial FBG array may be achieved. Of course, there may be now no requirement for similar reflectivities between the laser calibrator and the FBGs in the serial sensor link. In this case the laser calibrator still operates on a reflection mode, which results in a fiber coupler or a circulator needing to be utilized to tap the signal reflected from the laser calibrator to the photodetector. For this reason, utilizing an optical interferometer, such as a Mach-Zehnder interferometer that may work by the detection of its transmission, may be advantageous.

FIG. 6 is an exemplary diagram showing parallel utilization of a laser calibrator system 600. The laser calibrator system 600 may include a fiber coupler 610, a photodetector 620, a variable optical attenuator 630, an amplifier 640, an A/D convertor 650 and a laser calibrator 660. The fiber coupler 610 may be an approximate two by two fiber coupler or the like. The photodetector 620 may receive one pulse sequence. The variable optical attenuator or VOA 630 may be utilized to ensure the peak optical powers from the laser calibrator 660 are similar in magnitude to the one from an FBG in the serial sensor link. This will allow the system to be utilized for interrogation of FBGs with different reflectivities. The electronic amplifier 640 may amplify the signal from the photodetector 620 to a sufficient level to best utilize the resolution of the A/D convertor 650. The A/D converter 650 may convert a continuous physical quantity (i.e., voltage) to a digital number that represents the quantity's amplitude. The laser calibrator 660 described may be applied to calibrate in real time a variety of tunable lasers.

Another alternative to the laser calibrator cascaded into the serial FBG link as shown in FIG. 4 or FIG. 5 may be to replace the optical circulator with a fiber coupler. This design may be illustrated in FIG. 6. The pulse laser propagates to the serial FBGs through an approximate two by two fiber coupler. The splitting ratio of the coupler may be arbitrary or may be designed to generate the best signal to noise ratio or SNR for both the signals from the serial FBGs and the laser calibrator. A VOA may be utilized to ensure the peak optical powers from an FBG in the serial sensor link and from the laser calibrator may be the same or similar at the photodetector as explained for the system shown in FIG. 6. To accurately determine the shift of an FBG reflection spectrum in response to a measurement such as temperature or strain, a signal correlation method may be applied. Consider two spectral power density functions $S_1(\lambda,j)$ and $S_2(\lambda,j)$, where $j=1, 2 \ldots N$ represent the index of the wavelength at which the magnitude of a spectrum may be measured. If N may be a limited finite number, as long as the spectra does not very rapidly, the interpolation utilizing the measured values allows the construction of the entire spectra for any wavelength in the measured wavelength range. Also a spectrum may be normalized by its peak value. Assume $S_1(\lambda_j)$ and $S_2(\lambda_j)$ may be the normalized spectra reflected from an FBG under two different conditions such as different temperatures. The wavelength shift may be calculated by:

$$\frac{d}{d\Delta} \int_0^\infty S_1^N(\lambda - \Delta) \cdot S_2^N(\lambda) \cdot d\lambda = 0$$

The solution $\Delta$ of the equation above may be the wavelength shift of the grating. The center wavelength, $\lambda_c$, of an FBG may also be calculated utilizing a mass center algorithm, which is $$\lambda_c = \frac{\sum_1^N S(\lambda_j) \cdot \lambda_j}{\sum_1^N S(\lambda_j)}$$

Besides the measurement of temperature, strain, or pressure that may directly shift the FBG reflection spectrum utilizing the systems shown in FIG. 4 or FIG. 5, some other quantities may also be measured by the same techniques. For example, if the FBG may be coated with some functional materials, the FBG reflection spectrum or its peak wavelength may change in response to a parameter that changes the coating dimension along the fiber axis. One such example may be palladium which swells when it may be exposed to hydrogen. Therefore, when the FBG may be coated with palladium, the FBG may then be utilized to measure hydrogen concentration in a distributed manner.

Similarly, electric or magnetic fields may be measured by the utilization of coatings of piezoelectric or magnetostrictive materials. The measurement may not be limited to physical quantities or chemical gases only. Even biological quantities may also be measured by coating the FBG with an antigen or antibody which may then combine with its counterpart. The specific combination may result in a dimensional change which may then be detected by the serial FBG array.

Spatial information about acoustic wave or vibration may be important in many applications such as oil downhole monitoring, seismology, and detection of partial discharges or PDs for power transformers and high voltage power cables. There may be some methods already developed for distributed measurement of acoustic waves or vibration. These methods usually rely on the detection of the extremely weak Raleigh backscatters. For a standard low loss silica single mode fiber, the reflection strength of Raleigh scattering in the fiber may be typically approximately −66 dB per meter of fiber. This extremely weak reflection dictates the rather limited signal to noise ratio or SNR of these systems. The weak Raleigh back scatter also further limits the best spatial resolution offered by these methods because the fiber backscatter signal will not offer a sufficient SNR if the fiber segment (i.e., the spatial resolution) that generates the Raleigh backscatter signal may be set too short (i.e., shorter than 1 meter). In addition, Raleigh backscatter based methods also suffer from low signal contrast (in the order of 10%) and nonlinear signal demodulation, which often generates harmonics in acoustic or vibration detection.

Figure 7:
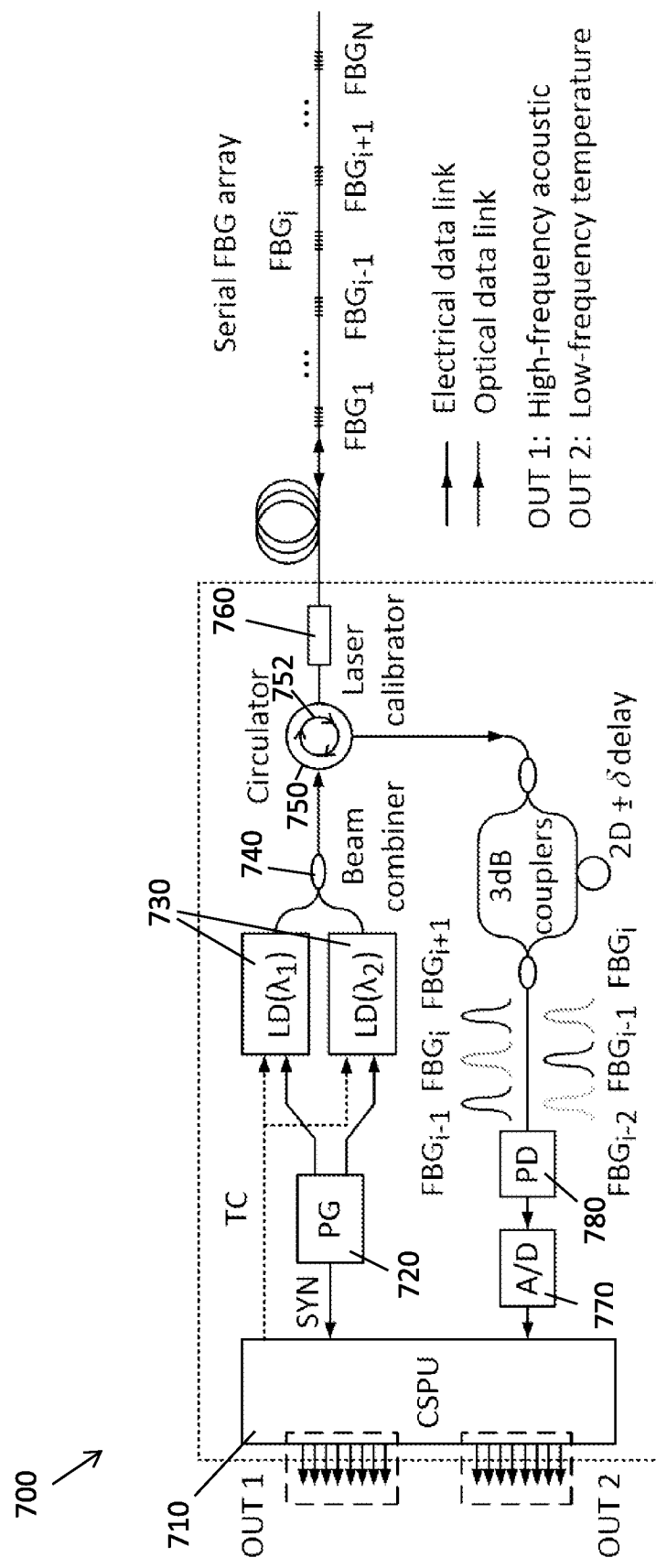
FIG. 7 is an exemplary diagram showing an alternating mode of operation for distributed acoustic or vibration sensing.

FIG. 7 is an exemplary diagram showing an alternating mode of operation for distributed acoustic or vibration sensing system or DAVSS 700. The DAVSS 700 may include a Central Signal Processing Unit or CSPU 710, a pulse generator 720, a plurality of laser diodes or LDs 730, a beam combiner 740, a circulator 750, a laser calibrator 760, an A/D convertor 770 and a photodetector 780. The CSPU 710 may control the lasers' wavelengths to ensure spectral accuracy and provide wavelength tuning. The pulse generator 720 may drive the two lasers to alternatively generate short pulses with sampling frequency $f_s$. The LDs 730 may each have a corresponding light wavelength λ in a vacuum. The beam combiner 740 may be a regular approximate two by two or approximate two by one fiber coupler or a wavelength division multiplexer or an approximate two by one fiber switch. The circulator 750 may be an optical circulator 752 or the like. The laser calibrator 760 may include a plurality of FBGs or a pair of broadband partial reflectors or BPRs and/or an FBG. The A/D convertor 770 may convert a continuous physical quantity (i.e., voltage) to a digital number that represents the quantity's amplitude. The photodetector 780 may be in communication with the A/D convertor 770 or the like.

The new sensor system for distributed acoustic or vibration sensing is shown in FIG. 7. The same system also offers measurement of the reflection spectrum or reflection spectrum shift for each of the serial FBGs. Since various parameters such as temperature variations or strain may shift the FBG reflection spectrum, the system therefore offers distributed measurement of temperature or strain or any other parameters that may shift the FBG spectrum besides acoustic wave or vibration. The serial FBGs utilized may or may not be weak reflecting and may or may not be broadband in their reflection spectra. If the FBGs may be broadband, the desired broadband may be obtained by shortening the FBG length or by varying the FBG period along the fiber. An FBG with a varying period may be often referred to as a chirped FBG. The chirp may be linear or nonlinear. No matter which type of FBGs may be utilized, the reflection spectra of any two neighboring FBGs must overlap significantly even when the FBGs may be subject to changes in their environments. Some of these environmental changes may include but may be not limited to strain, pressure or temperature variations. Also these FBGs generally have an equal spacing of D between two neighboring FBGs as shown in FIG. 7. The FBG interrogation system comprises of an optical source, a photo-detector and a central signal processing unit or CSPU. The optical source may include a single laser or two lasers with different wavelengths but both the wavelengths may be well within the reflection spectra of the FBGs and may be chosen for the so-called quadrature phase detection. For example, for an FP interferometer formed by two weak FBGs, the reflection power may be simply a cosine function of 1/λ, where λ is the light wavelength in a vacuum. Then when one wavelength may be at a peak of a fringe, the other should be at or around the middle of the same fringe or a different fringe. Such selection of the laser frequencies enables the quadrature detection, ensuring uniformly sufficient sensitivity at arbitrary optical distance which is defined by the product of the fiber length between two neighboring FBGs and the index of refraction of the fiber. For the case of a single laser as the source for acoustic or vibration measurement, the laser may generate an optical pulse whose optical frequency or wavelength is time dependent within the laser pulse. When the laser is a laser diode, its optical frequency naturally depends on its driving current. When the laser pulse is produced by direct current modulation, the laser frequency may spontaneously vary in time. A desirable frequency-time relation may be obtained by the control of the laser current pulse magnitude and shape.

The two lasers may have two working modes. One may be alternating in time, which results in that when one laser may be generating a pulse, the other laser may be off and visa-versa. The second mode may be that the two lasers send out optical pulses into the serial FBGs at the same time. In this mode, the pulse generator drives the two lasers to alternatively generate short pulses with sampling frequency $f_S$. The upper limit for $f_S$ is defined by the time of flight or TOF of the optical pulses in the link (i.e., cable optical length divided by speed of light in the fiber). The alternating laser pulses at different wavelengths may be combined into one fiber by a beam combiner. The beam combiner may be a regular approximate two by two or approximate two by one fiber coupler or a wavelength division multiplexer or an approximate two by one fiber switch. The signal reflected from the serial FBGs becomes a pulse sequence. These pulses enter into a Mach-Zehnder interferometer or MZI with the two aims different by a fiber length of 2D+δ or 2D−δ, where D may be the fiber separation between two neighboring FBGs. This difference is often referred to as the MZI path imbalance. Usually δ is far smaller than 2D and is designed to permit the quadrature detection for the given wavelengths of the two lasers. It should be pointed out that the MZI may be replaced by a different interferometer such as a Michelson interferometer or MI that has the same path imbalance as the MZI's. In the case of a MI, the reflection from the interferometer is detected. When the pulse sequence reflected from the serial FBGs enters into the MZI, the light out of the MZI now may include two sets of pulse sequences with the second delayed with respect to the first by approximately the same temporal interval between the two adjacent pulses in any of the two pulse sequences. Consequently, the pulse reflected from one FBG largely coincides with the one from the next FBG as shown in FIG. 7 (i.e., pulse i is blue colored in the first or upper pulse sequence coinciding with pulse i-1 which is brown colored in the second or lower pulse sequence). Since these coinciding pulse pairs may be from the same laser pulse input into the serial FBGs so they may be phase correlated and may thus effectively interfere with each other. The interference optical signal after the MZI may be detected with a photo-detector and further amplified and converted into digital signal. The signal may be processed in the CSPU to acquire distributed acoustic emission information in real time. The CSPU also controls the lasers' wavelengths to ensure spectral accuracy and provide wavelength tuning by controlling the temperatures of the two lasers if they may be DBF lasers via the built-in TECs. For the case of a single laser as the source for acoustic or vibration measurement, the overlapped temporal region between any pair of two coinciding pulses out of the MZI may exhibit interference fringes. This is because different times of the laser pulse have different optical frequencies. In the signal detection and processing, these fringes may be sampled at different times to generate the signals as needed for quadrature detection.

Figure 8:
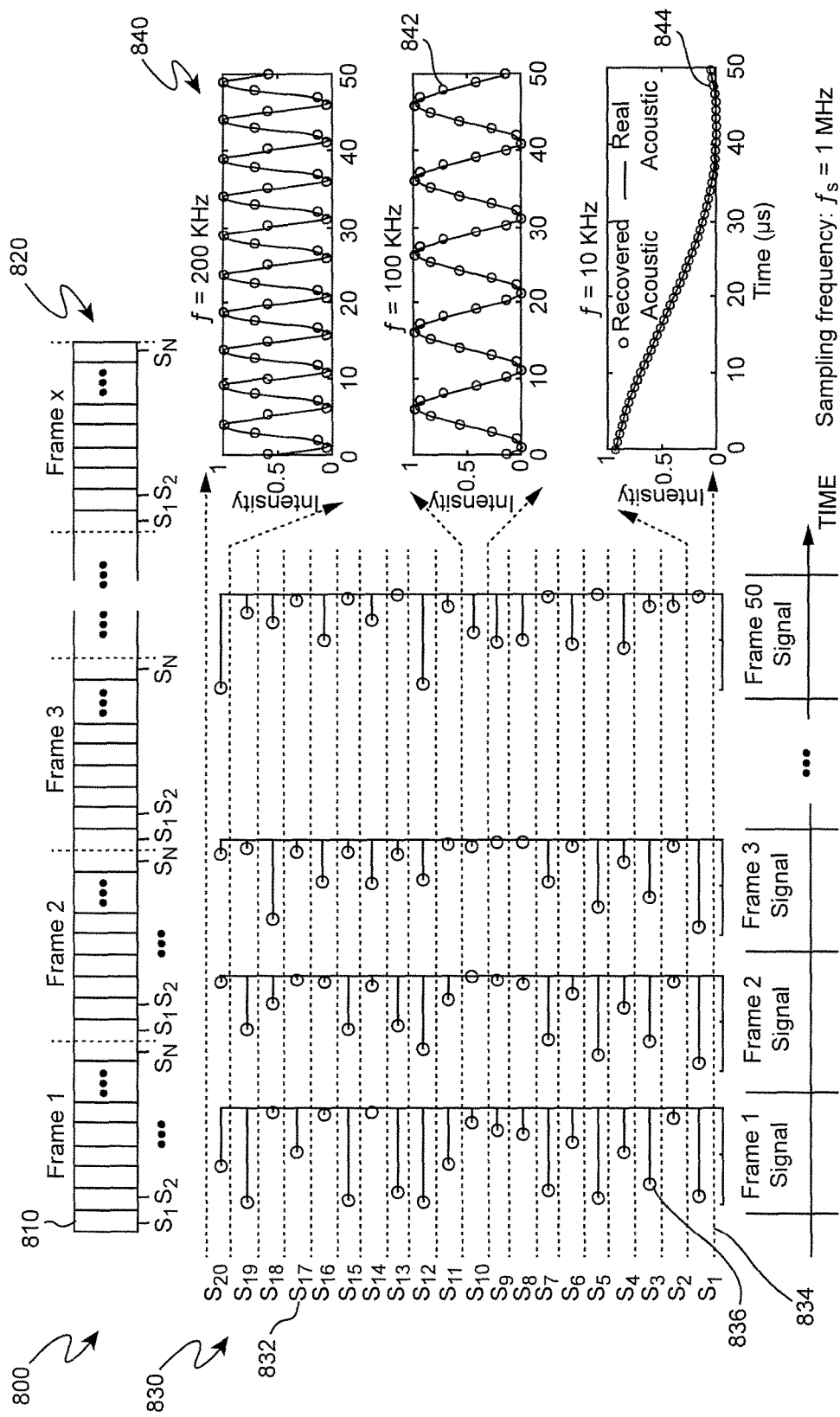
FIG. 8 is an exemplary diagram showing a sensor data frame structure and a simulation result demonstrating a TDM method.

FIG. 8 is an exemplary diagram showing a sensor data frame structure 800. The sensor data frame structure 800 may include a plurality of frames 810 with a plurality of sensor signals 820. The frames 810 may be sequential. The sensor signals 820 may include a plurality of sensor data.

The FBG based FP interferometers have to be interrogated fast enough for acoustic or vibration measurement. As explained before, each laser pulse at one of the two selected wavelengths injected into the fiber may be split into a sequence of pulses due to back-reflections generated by the downstream FBGs. Each pulse in the sequence may be then further split into two pulses by the MZI with a relative displacement as defined by the MZI path imbalance 2D+δ or 2D−δ. Each pulse in one pulse sequence then largely coincides with its corresponding pulse in the other pulse sequence. Each pair of two coinciding pulses represents the signal from the FP interferometer formed by the two FBGs that produce the two coinciding pulses. The interference of these two pulses yields a signal for each of the two laser wavelengths. Therefore, two interference signals are produced corresponding to the two laser wavelengths. By a quadrature detection method, these two interference signals allow accurate detection of a change in the optical distance between the two neighboring FBGs that generate the two pulses. The optical distance change is proportional to the magnitude of the acoustic wave impinging on the fiber. The received data stream thus comprises a series of data frames, within each frame, signals from different sensing nodes may be multiplexed in a time division multiplexing or TDM fashion, as illustrated in FIG. 8.

FIG. 8 is an exemplary diagram showing a simulation result demonstrating a TDM method. FIG. 8 includes a signal matrix 830 and three sensor signals 840. The signal matrix 830 may include a plurality of columns 832, a plurality of rows 834 and a simulated sensor signal 836. The three sensor signals 840 may be compared to one or more real acoustic signals 842 with reconstructed signal data 844.

FIG. 8 shows the simulation result. During signal processing, the data stream may be virtually truncated and pieced together to form a data matrix as shown in FIG. 8. Each column of the matrix originates from an individual data frame, whereas each row corresponds to a temporally sampled sequence from an individual sensor. Outputting each row results in a reconstructed acoustic signal as demonstrated in FIG. 8. The recovered signals detected by sensors 1, 10 and 20 may be shown as circles in the plots, demonstrating excellent agreement with the original acoustic signals shown in solid lines. For quadrature detection, the two lasers may be also multiplexed with TDM, periodically alternating the injection wavelength.

Figure 9:
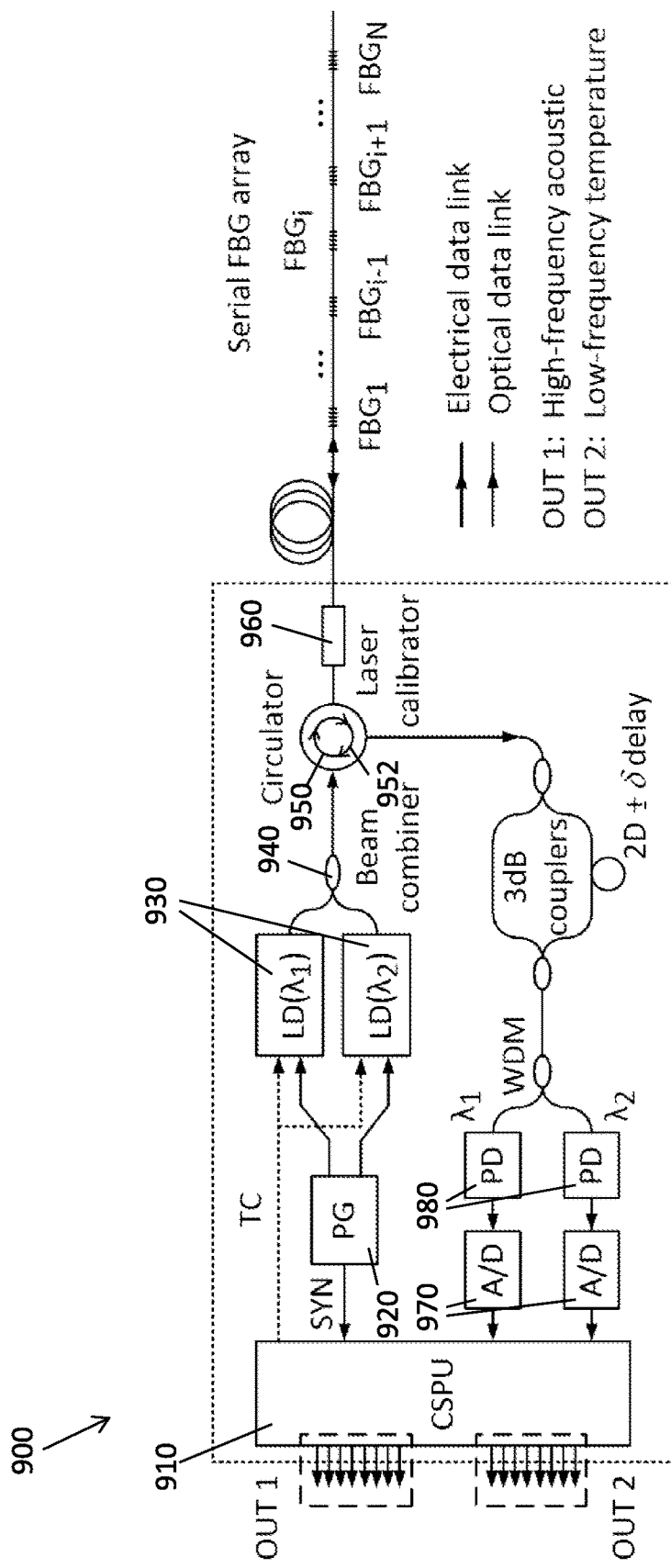
FIG. 9 is an exemplary diagram showing a synchronous mode of operation for distributed acoustic or vibration measurement.

FIG. 9 is an exemplary diagram showing a synchronous mode of operation for distributed acoustic or vibration measurement system or DAVMS 900. The DAVMS 900 may include a Central Signal Processing Unit or CSPU 910, a pulse generator 920, a plurality of laser diodes or LDs 930, a beam combiner 940, a circulator 950, a laser calibrator 960, one or more A/D convertors 970 and a photodetector 980. The CSPU 910 may control the lasers' wavelengths to ensure spectral accuracy and provide wavelength tuning. The pulse generator 920 may drive the two lasers to alternatively generate short pulses with sampling frequency $f_s$. The LDs 930 may each have a corresponding light wavelength λ in a vacuum. The beam combiner 940 may be a regular approximate two by two or approximate two by one fiber coupler or a wavelength division multiplexer or an approximate two by one fiber switch. The circulator 950 may be an optical circulator 952 or the like. The laser calibrator 960 may include a plurality of FBGs or a pair of broadband partial reflectors or BPRs and/or an FBG. The A/D convertor 970 may convert a continuous physical quantity (i.e., voltage) to a digital number that represents the quantity's amplitude. The photodetector 980 may be in communication with the A/D convertor 970 or the like.

In this mode, the two lasers with the two different wavelengths send out laser pulses at the same time. The laser pulses may be combined by a beam combiner, which may be a wavelength division multiplexer or WDM or simply an approximate two by two or an approximate two by one fiber coupler into the input fiber and propagate to the FBG array. The laser pulses after the MZI may be separated into two channels by their wavelengths and detected separately as shown in FIG. 9. The laser wavelengths and δ may be also selected for the quadrature detection. After the MZI, the optical signals from the two lasers may be separated by their wavelengths via the WDM.

Figure 10:
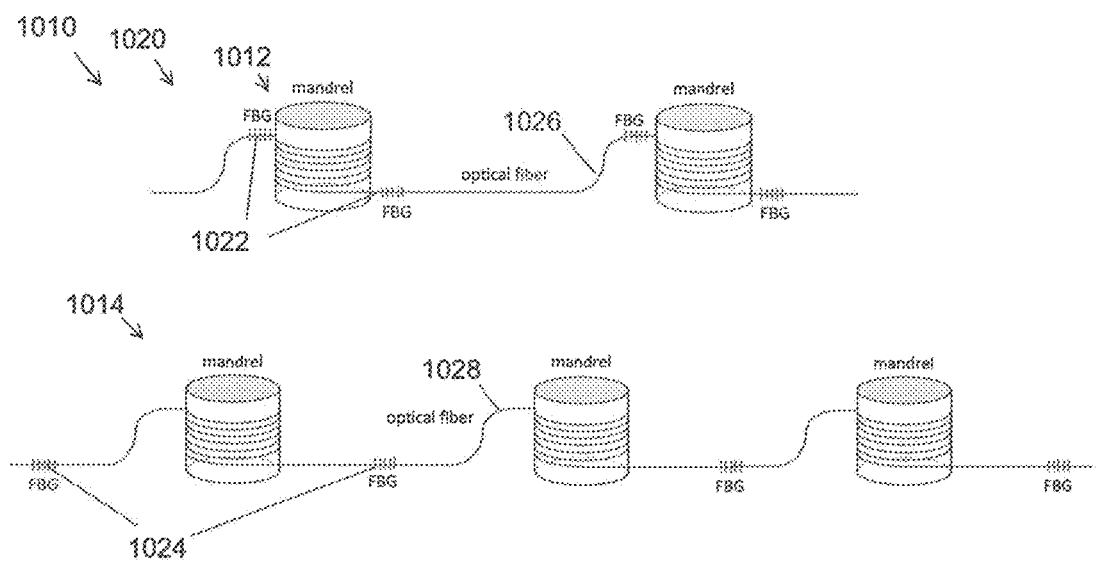
FIG. 10 is an exemplary diagram showing a plurality of mandrels each in an FBG array.

FIG. 10 is an exemplary diagram showing a plurality of mandrels 1010 in combination with a plurality of FBG arrays 1020. The mandrels 1010 may include a first plurality of mandrels 1012 and a second plurality of mandrels 1014. The FBG arrays 1020 may include a first plurality of FBG arrays 1022 and a second plurality of FBG arrays 1024 that are disposed on a first optical fiber 1026 and a second optical fiber 1028. It should be noted that these mandrels may simply be air. In other words, each sensor element may be just a fiber coil with a plurality of fiber revolutions.

Sometimes an interferometer may exhibit a eater sensitivity by increasing the interferometric cavity length or multiple revolutions of fiber on a mandrel or in a fiber coil. This may be because a longer interferometric cavity results in a greater absolute cavity change for a given percent change of the cavity induced by a measurement. For an FP interferometer, the reflection power changes by a full fringe when the FP cavity and optical path length changes by one half wavelength regardless of its original cavity length. However, there may be a limit against this method, which may be the laser phase noise. For a given source phase noise, the contribution to the noise at the photodetection by the source phase noise grows proportionally with the interferometer cavity length. When the interferometer may be sufficiently long, the laser phase noise becomes the dominant source of noise in the entire system. Further increasing the interferometer length will then not improve the system sensitivity anymore. However, as described earlier, the interference between two pulses that may be originated from the same laser pulse may exhibit minimum sensitivity to the laser phase noise. This is because most of the sensing interferometer length is countered by the MZI path imbalance, which nearly matches the sensing interferometer length with only the residual □. This offers the opportunity to increase the measurement sensitivity of acoustic wave or vibration by increasing the length of the fiber between two FBGs. If the fiber may be kept straight, the fiber length between two neighboring FBGs may eventually exceed such a length where part of it may see fiber length elongation while another part may experience length compression. As a result, much of the acoustic or vibration act on the fiber may be canceled. To overcome this problem, the fiber may be wrapped on a mandrel or simply coiled so the spatial occupation of the FP cavity fiber in one spatial direction may be reduced. An incident acoustic wave acts on the mandrel or on the fiber coil to change the mandrel diameter which in turn modulates the length of the fiber wrapped on it. By this method, the total length change to the fiber between the two FBGs may be amplified. A mandrel may be made of different materials and dimensions to maximize the change to the length of the fiber wrapped on it for a given acoustic wave with known incident direction, amplitude, polarization and frequency. Also these mandrels may be arranged in various ways. FIG. 10 shows an arrangement where each mandrel has two FBGs at the start and end of the fiber wrapped on the mandrel respectively. The distance between two neighboring mandrels may be arbitrary and may not be equal to the length of the fiber wrapped on a mandrel. In this case, the MZI path imbalance should be nearly equal to the length of the fiber wrapped on a mandrel. In contrast, FIG. 10 presents an arrangement where the fiber length between any two neighboring FBGs may be a constant and part of the fiber between two FBGs may be wrapped on a mandrel.

Figure 11:
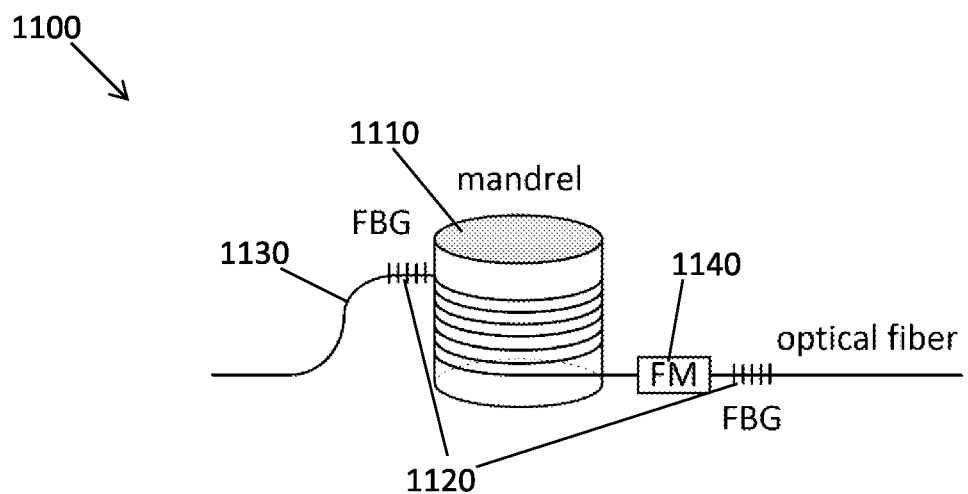
FIG. 11 is an exemplary diagram showing a Faraday mirror to marcel a fiber birefringence effect on FP interference.

FIG. 11 is an exemplary diagram showing a Faraday mirror to marcel a fiber birefringence effect on FP interference 1100. FIG. 11 includes a mandrel 1110, a plurality of FBGs 1120, an optical fiber 1130 and a Faraday mirror 1140. The mandrel 1110 may be made of different materials and dimensions to maximize the change to the length of the fiber wrapped on it for a given acoustic wave with known incident direction, amplitude, polarization and frequency. The FBGs 1120 may be disposed before and after the mandrel 1110. The optical fiber 1130 may be wrapped around the mandrel 1110. The Faraday mirror 1140 may cancel the fiber birefringence effect on the FP interference.

Fiber bending in general creates optical birefringence. Besides the bending induced birefringence, fiber may also have an initial birefringence due to internal non-uniform stresses frozen from the fiber fabrication and non circular geometry of the fiber core. These birefringence may cause the state of polarization of the light reflected from the second FBG of an FBG based FP interferometer to be different than that of the reflection from the first FBG. As a result, the interference of the two light beams may not be the most effective. To overcome this problem, a Faraday mirror or FM may be utilized right before the second FBG as shown in FIG. 11. The FM rotates each of the polarization components along the two principal axes of the fiber birefringence induced by the fiber bending or other factors by approximately ninety degrees. When the polarization rotated light travels back through the same fiber, the state of polarization returns to that of the light right before entering into the fiber loop. Therefore, maximum interference between the two light beams from the first and the second FBGs takes place.

Figure 12:
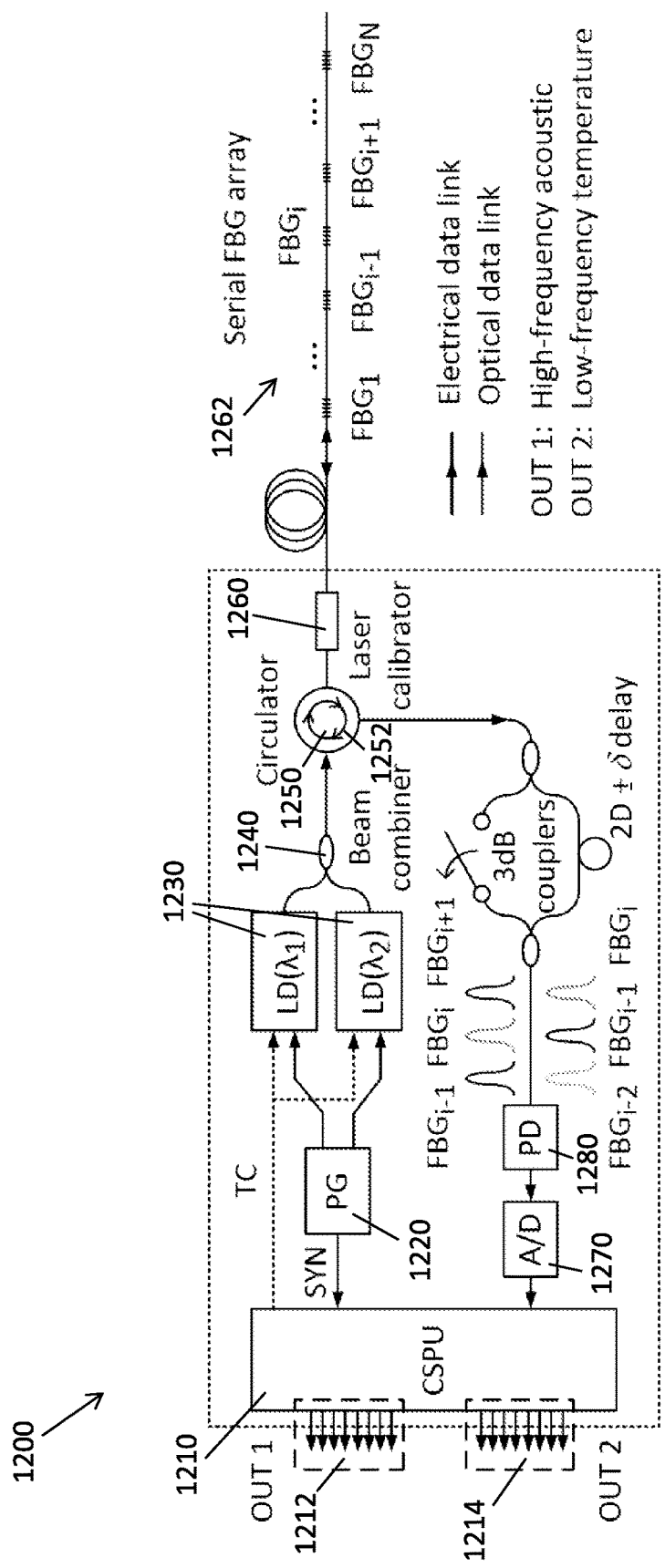
FIG. 12 is an exemplary diagram showing a sensor system for distributed measurement of acoustic wave or vibration and the optical reflection spectra of a plurality of serial FBGs.

FIG. 12 is an exemplary diagram showing a sensor system for distributed measurement of acoustic wave or vibration or a SSDMAWV 1200 and the optical reflection spectra of a plurality of serial FBGs. The SSDMAWV 1200 may include a Central Signal Processing Unit or CSPU 1210, a pulse generator 1220, a plurality of laser diodes or LDs 1230, a beam combiner 1240, a circulator 1250, a laser calibrator 1260, an A/D convertors 1270 and a pair of photodetectors 1280. The CSPU 1210 may have a first outlet 1212 and a second outlet 1214. The pulse generator 1220 may drive the two lasers to alternatively generate short pulses with sampling frequency $f_s$. The LDs 1230 may each have a corresponding light wavelength $\lambda$ in a vacuum. The beam combiner 1240 may be a regular approximate two by two or approximate two by one fiber coupler or a wavelength division multiplexer or an approximate two by one fiber switch. The circulator 1250 may be an optical circulator 1252 or the like. The laser calibrator 1260 may include a plurality of serial FBG arrays 1262. The A/D convertor 1270 may convert a continuous physical quantity (i.e., voltage) to a digital number that represents the quantity's amplitude. The photodetector 1280 may be in communication with the A/D convertor 1270 or the like.

The system shown in FIG. 7 or 9 for distributed acoustic or vibration measurement may be modified slightly to measure not only acoustic wave or vibration but also the reflection spectrum or spectrum shift for each of the serial FBGs. FIG. 12 presents one example modification to the system by inserting a fiber switch in one of the two anus of the MZI. When the system may be operated for distributed measurement of acoustic waves or vibration, the switch should be closed. The system has then no difference from the one shown in FIG. 7 or FIG. 9. It permits distributed measurement of acoustics or vibrations. When the system operates for the measurement of the reflection spectrum of each of the serial FBGs only one of the two lasers needs to operate. Also the fiber switch should be opened. When the laser sends an optical pulse into the FBG array, instead of two pulse sequences as previously generated by the MZI, only one pulse sequence may be received by the photodetector. The reflection spectrum of an FBG may then be measured by tuning the wavelength of the operating laser source step by step as explained in the description of the system shown in FIG. 4 or FIG. 5. In the system shown in FIG. 12, acoustic wave or vibration and the FBG reflection spectra may be measured sequentially by controlling the fiber switch in the MZI. The system may also be revised for simultaneous measurement of acoustics or vibration and FBG reflection spectra.

Figure 13:
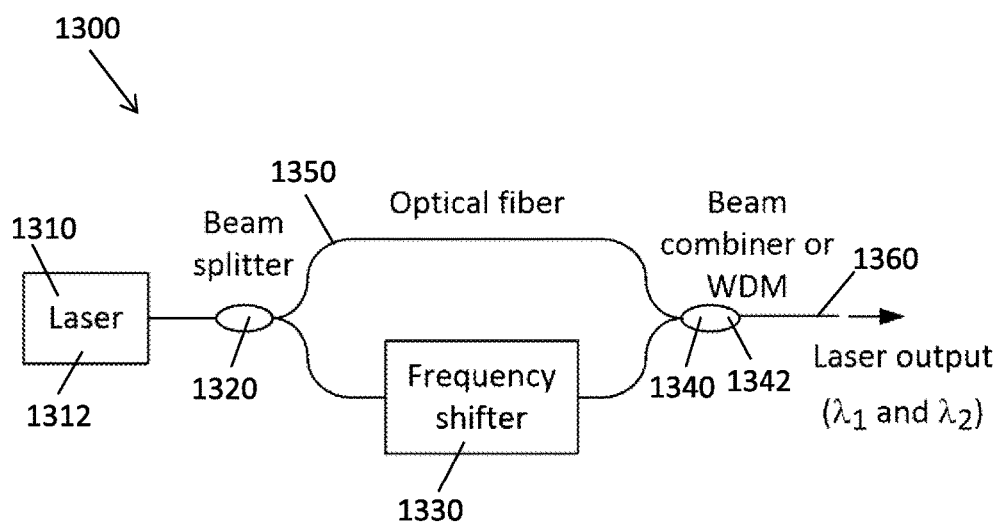
FIG. 13 is an exemplary diagram showing generation of a laser system at two different frequencies by utilization of one laser.

FIG. 13 is an exemplary diagram showing generation of a laser system 1300 at two different frequencies by utilization of one laser. The laser system 1300 may include a laser 1310, a beam splitter 1320, a frequency shifter 1330, a beam combiner 1340, an optical fiber 1350 and a laser output 1360. The laser may generate a pair of laser beams 1312 with two different frequencies. The beam splitter 1340 may be bulk optics based, optical fiber based or the like. The beam combiner 1340 may be a regular approximate two by two or approximate two by one fiber coupler or a wavelength division multiplexer or an approximate two by one fiber switch. The beam combiner 1340 may be replaced by a wavelength division multiplexer or WDM 1342. The optical fiber 1350 may extend from the laser 1310 and the beam splitter 1320. The laser output 1360 may include the pair of laser beams 1312 each with a separate wavelength.

The two laser beams at two different wavelengths or frequencies utilized for the quadrature phase detection in the system shown in FIG. 7, 9 or 12 may be generated by a single laser instead of two lasers. One may be a two frequency laser. In these lasers, one laser cavity may produce a laser beam comprising of two different wavelengths. For example, if the laser fiber has birefringence, the two output lasers have not only orthogonal polarizations but also different wavelengths. Another one source approach may be to utilize a regular single frequency laser and split the output laser beam into two channels as shown in FIG. 13. One channel has the original laser but the laser in the second channel may be shifted in frequency. The frequency shift may be realized by various ways. One may be to utilize an acoustoptic frequency shifter which may be bulk optics based or optical fiber based. The basic principle may be to apply an acoustic wave to the optical medium in which the laser beam is to be shifted in frequency propagates. Owing to the Doppler frequency shift effect, the laser frequency may be shifted by the traveling gating induced in the optical medium by the acoustic wave. Up or down frequency shift may be achieved by setting the laser propagation relative to the acoustic direction. Another common way to shift a laser frequency may be to modulate the intensity of the laser by a certain frequency f.

The intensity modulated laser will then exhibit two frequencies, namely fo+f and fo−f where fo is the original laser frequency. An optical filter may be utilized to select or block one of the two frequencies if only one new frequency may be needed.

It should be pointed out that in the system shown in FIG. 12, two lasers at different wavelengths may be utilized for the quadrature detection to ensure that the system may always respond to a small change in the FP cavity regardless of the initial cavity value. In some applications, the acoustic or vibration induced FP cavity change may be so large (i.e., greater than a quarter fringe) that the output interference signal may be detectable even when the operating point of the FP cavity may be at the maximum or the minimum of a fringe. In these cases, utilizing one laser may sometimes be sufficient. This may be especially true if the detection may be to tell the occurrence and location of an acoustic impingement or vibration to the fiber, and/or the perturbation magnitude or frequency spectrum.

It should also be noted that the serial FBGs in the systems for the distributed acoustic or vibration sensing as described previously may be replaced by other types of optical reflectors if only distributed measurement of acoustic wave or vibration may be needed. These reflectors may be broadband. Some of the example reflectors include but may be not limited to the ones shown in FIG. 2.

Figure 14:
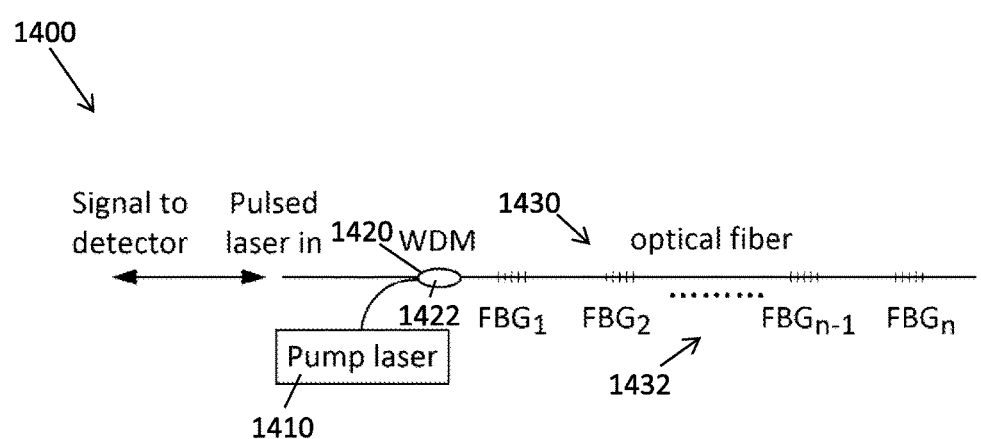
FIG. 14 is an exemplary diagram showing a sensing span increase by distributed Raman amplification.

FIG. 14 is an exemplary diagram showing a sensing span increase by distributed Raman amplification for an optical fiber 1400. The optical fiber 1400 may include a pump laser 1410, a wavelength division multiplexer or a WDM 1420 and a plurality of FBGs 1430. The pump laser 1410 may produce a pump laser frequency that may be approximately 11 THz greater than the signal laser to be amplified for a regular silica single mode fiber. The WDM 1420 may allow an input pulsed laser (i.e., signal laser) 1422 and the pump laser 1410 to be coupled into the optical fiber 1400 with minimum loss. The FBGs 1430 may be a plurality of series FBGs 1432 disposed within the optical fiber 1400.

Self-phase modulation may be a nonlinear optical effect resulting from light-matter interaction. When a short laser pulse propagates in a fiber, the refractive index of the fiber may be modulated by the laser itself via the Kerr effect. This index variation will result in a phase shift to the laser pulse, which then leads to a change to the laser spectrum. If the laser pulse may be very intensive, the laser spectrum may be severely distorted and broadened. Thus the self-phase modulation may place a strong limit on the maximum peak power of a short laser pulse that needs to be transmitted in a long single mode optical fiber without significant laser spectrum distortion. Therefore, the sensor systems shown in FIG. 4, 5, 7 or 9 will have a limited maximum length of the sensing fiber. To overcome this sensing span limit, the injected laser pulse may be amplified in a distributed manner by the Raman gain as shown in FIG. 14. It should be noted that although the parallel utilization of the laser calibrator may be shown in the system, other methods of the utilization of the laser calibrator may still be applied to this system.

For a regular silica single mode fiber, the pump laser frequency may be approximately 11 THz greater than the signal laser to be amplified. For example, the pulse laser to be amplified may be at approximately 1550 nm, the pump laser wavelength should be approximately 90 nm shorter than approximately 1550 nm, which may be approximately 1460 nm. The Raman pump laser launches a strong CW pump laser beam into the main fiber trunk where the serial FBGs may be connected via a WDM. The WDM allows the input pulsed laser (i.e., signal laser) and the pump laser to be coupled into the serial FBGs with minimum loss for each of the two laser beams. As the laser pulse from the signal laser propagates in the fiber to co-propagate with the pump laser, the Raman gain generated by the pump laser in the fiber amplifies the signal laser power. When a portion of the signal laser may be reflected by an FBG, the reflected light may be also amplified by the Raman gain as the reflection travels back toward the photodetector. This method may therefore increase the optical power reflected from the serial FBGs to the photodetector. Also, the distributed Raman amplification permits longer sensing fiber to be utilized. To block most of the amplified Raman spontaneous emission or ARSE from entering into the photodetector, an optical band pass filter centered to the FBG reflection wavelengths may also be utilized before the photodetector to further suppress the ARSE, noise. It should be noted that the WDM also helps suppress the ARSE noise if its pass band for the serial FBG reflections may be narrower than the spectral width of the ARSE.

Figure 15:
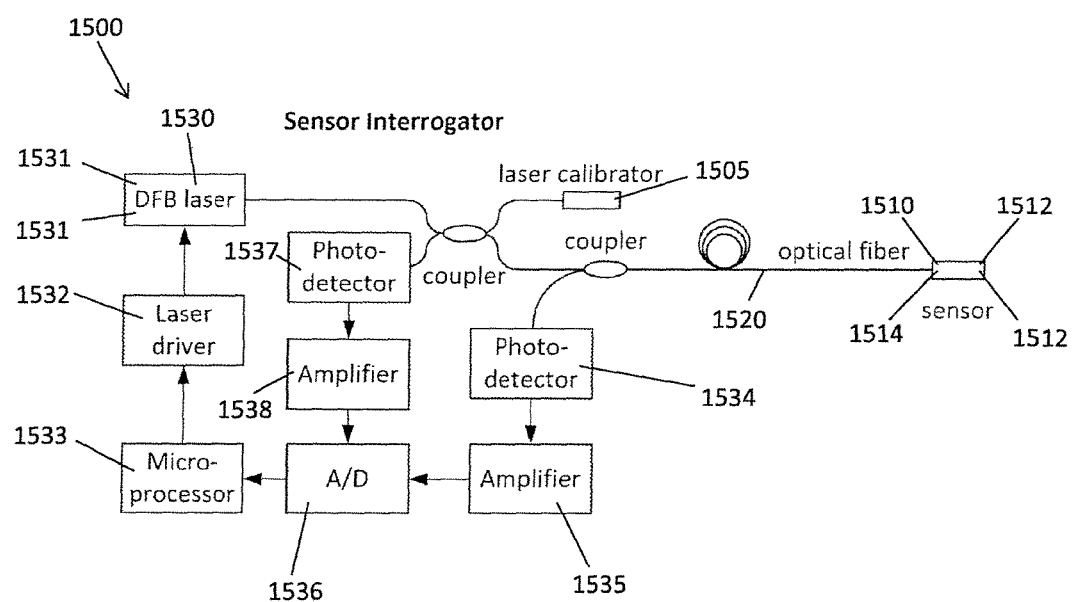
FIG. 15 is an exemplary diagram showing interrogation of a single sensor system by utilization of a DFB laser in combination with a laser calibrator with a sensor interrogator.

FIG. 15 is an exemplary diagram showing interrogation of a single sensor system 1500 by utilization of a DFB or a VCSEL laser in combination with a laser calibrator 1505 with a sensor interrogator. The single sensor system 1500 may include a single sensor 1510, an optical fiber 1520 and a sensor interrogator 1530. The single sensor 1510 may be an interferometer sensor 1512 such as a Fabry-Perot interferometer 1512A, a wavelength-modulated sensor 1514 or the like. The optical fiber 1520 may extend from the single sensor 1510 to the sensor interrogator 1530. The sensor interrogator 1530 may include a DFB laser 1531 or a VCSEL laser 1531A, a laser driver 1532, a microprocessor 1533, a first photodetector 1534, a first amplifier 1535, an A/D converter 1536, a second photodetector 1537, a second amplifier 1538 and a laser calibrator 1539.

The laser calibrator may be utilized in conjunction with a tunable laser to interrogate other sensors besides fiber Bragg gratings. These sensors include but may be not limited to interferometers and wavelength-modulated sensors. One example sensor may be the fiber optic Fabry-Perot interferometers including both the intrinsic Fabry-Perot interferometer or IFPI and the extrinsic Fabry-Perot interferometer or EFPI. A DFB laser may be utilized as the optical source. The laser may operate in either the continuous wave or CW or the pulse mode. If only one sensor may be interrogated, the CW mode works well. If multiple sensors need to be interrogated, the laser could operate in the CW or the pulse mode. The interrogation of multiple sensors will be subsequently explained in greater detail.

The system shown in FIG. 15 has only one sensor so the source may be in the CW mode. The wavelength of the source may be tuned by varying the laser temperature via the built-in TEC. For a VCSEL, laser, the laser wavelength may be tuned by its driving current. The output of the laser may be split in two channels by the first two by two fiber coupler. One beam travels to the laser calibrator and the reflected signal from the calibrator may be detected by the photodetector for the real-time laser calibration in both laser intensity and wavelength. The other laser beam propagates to the sensor which may be an FBG, an FP sensor or any other interferometric or wavelength-modulated sensor. The reflection from the sensor may be detected by the second photodetector. By the signal from the laser calibrator, the optical spectrum reflected by the sensor may be accurately determined. If the sensor may be an interferometer, the optical path difference or OPD of the sensor may be calculated based on the reflected optical spectrum via a white light interferometry algorithm. If the sensor may be an FBG, the reflection spectrum permits accurate measurement of a small shift to the spectrum due to FBG condition change, such as temperature variation.

If multiple sensors need to be interrogated by one tunable laser, such as a TEC controlled DFB laser, there may be several options. One may be the CW mode based wavelength division multiplexing. These sensors may be connected in series or in parallel. This CW approach usually requires the sensors to be different. If these sensors may be FBGs, for example, they should have different Bragg wavelengths. The signal from different FBGs may be separated by their spectra. If these sensors may be interferometers such as Fabry-Perot interferometers, their OPDs should be different from each other. The signal from such a sensor may be periodic variations (i.e., interference fringes) versus wave number or 1/λ but different OPDs lead to different frequencies in the wave number domain. Therefore, the signals from these sensors may be separated by their frequencies. One of the common ways to do so may be to perform a Fourier transform of the output contributed by all the interferometers with different optical path length distances or OPDs. Signals from these sensors will result in peaks at different frequencies. Then band pass filters may be utilized to extract each of the peaks. Interference fringes generated by each of the interferometers may be reconstructed. The application of a white light interferometry algorithm to the reconstructed fringes then permits accurate determination of the sensor OPD.

The CW mode wavelength division multiplexing of sensors may not work anymore if these sensors may be identical or similar in their reflection spectra. The optical source may then operate in the pulse mode. These sensors may be connected in the system in various ways. If they have a low loss to the transmitted optical beam, they may be multiplexed in series as seen in the examples for low reflecting or weak FBGs in the previous sections. If the sensor's transmittance may be low, they may be connected in parallel and the fiber that leads a sensor has a different length from the others so the optical pulse signal from this sensor will not overlap with the other pulses from the other sensors. The different fiber lengths for these different sensors may be realized by the utilization of fiber delay loops in the sensor interrogation instrument.

The foregoing description and accompanying figures illustrate the principles, one or more embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments may be made by those skilled in the art without departing from the scope of the invention as defined by the following claims.

What is claimed is:

1. A serial weak FBG interrogator, comprising:
a pulsed laser utilized as a laser source, an optical fiber extending from the pulsed laser, wherein each pulse of the pulsed laser injects a single wavelength laser pulse into the optical fiber;
an EDFA receiving the optical fiber extending from the pulsed laser, wherein the EDFA is added before light is injected into an FBG array;
an optical circulator receiving the optical fiber extending from the EDFA, the optical circulator extending the optical fiber to a laser calibrator, the laser calibrator being configured to generate information about laser output power and wavelength;
a photodetector receiving the optical fiber extending from the optical circulator, the photodetector extending an electrical connection;
a supplemental amplifier receiving the electrical connection from the photodetector;
an A/D converter receiving the electrical connection from the amplifier;
a computer system receiving the electrical connection from the A/D converter, the computer system having a processor and a memory system; and
a pulse generator receiving the electrical connection from the computer system, the pulse generator extending the electrical connection to the pulsed laser and the pulse generator controlling the pulse repetition rate or frequency, pulse width, delay with respect to an internal or external trigger and high and low voltage levels of a plurality of pulses.

2. The serial weak FBG interrogator according to claim 1, wherein the pulsed laser is a wavelength tunable pulsed laser.

3. The serial weak FBG interrogator according to claim 1, wherein a plurality of serial FBGs utilize one or more mandrels in the serial FBG array.

4. The serial weak FBG interrogator according to claim 1, wherein the photodetector is utilized in combination with an optical band pass filter before the photodetector.

5. The serial weak FBG interrogator according to claim 1, further comprises a beam splitter, a frequency shifter and a beam combiner to generate a pair of lasers at two different frequencies from a single laser.

6. The serial weak FBG interrogator according to claim 1, further comprises a beam splitter, a frequency shifter and a WDM to generate a pair of lasers at two different frequencies from a single laser.

7. A serial weak FBG interrogator, comprising:

a pulsed laser utilized as a laser source, an optical fiber extending from the pulsed laser, wherein each pulse of the pulsed laser injects a single wavelength laser pulse into the optical fiber;

an EDFA receiving the optical fiber extending from the pulsed laser, wherein the EDFA is added before light is injected into an FBG array;

a fiber coupler receiving the optical fiber extending from the EDFA, the fiber coupler extending the optical fiber to a laser calibrator, the laser calibrator being configured to generate information about laser output power and wavelength;

a photodetector receiving the optical fiber extending from the fiber coupler, the photodetector extending an electrical connection;

a supplemental amplifier receiving the electrical connection from the photodetector;

an A/D converter receiving the electrical connection from the amplifier;

a computer system receiving the electrical connection from the A/D converter, the computer system having a processor and a memory system; and a pulse generator receiving the electrical connection from the computer system, the pulse generator extending the electrical connection to the pulsed laser and the pulse generator controlling pulse repetition rate and frequency, pulse width, delay with respect to an internal or external trigger and high and low voltage levels of a plurality of pulses.

8. A serial weak FBG interrogator, comprising:

a pulsed laser utilized as a laser source, an optical fiber extending from the pulsed laser, wherein each pulse of the pulsed laser injects a single wavelength laser pulse into the optical fiber;

an optical circulator receiving the optical fiber extending from the pulsed laser, the optical circulator extending the optical fiber to a laser calibrator, the laser calibrator being configured to generate information about laser output power and wavelength;

an EDFA receiving the optical fiber extending from the pulsed laser, the EDFA being configured to amplify light in the optical fiber, the EDFA extending an optical fiber;

a photodetector receiving the optical fiber extending from the EDFA, the photodetector extending an electrical connection;

a supplemental amplifier receiving the electrical connection from the photodetector;

an A/D converter receiving the electrical connection from the amplifier;

a computer system receiving the electrical connection from the A/D converter, the computer system having a processor and a memory system; and a pulse generator receiving the electrical connection from the computer system, the pulse generator extending the electrical connection to the pulsed laser and the pulse generator controlling pulse repetition rate or frequency, pulse width, delay with respect to an internal or external trigger and high and low voltage levels of a plurality of pulses.

* * * * *